United States Patent
Urrutia Sagardia et al.

(10) Patent No.: US 12,453,703 B2
(45) Date of Patent: Oct. 28, 2025

(54) HUMIC SUBSTANCE-ENCAPSULATED PARTICLES, COMPOSITIONS AND METHOD OF MAKING THE SAME

(71) Applicants: Agro Innovation International, Saint Malo (FR); Universidad de Navarra, Pamplona (ES)

(72) Inventors: Oscar Urrutia Sagardia, Pamplona (ES); Javier Erro Garces, Pamplona (ES); Marta Fuentes Ramirez, Pamplona (ES); Roberto Baigorri Ekisoain, Huarte (ES); Angel Maria Zamarreno Arregui, Eugui (ES); Jean-Claude Yvin, Saint-Malo (FR); Jose Maria Garcia-Mina Freire, Iza (ES)

(73) Assignees: Agro Innovation International, Saint Malo (FR); Universidad de Navarra, Pamplona (ES)

(*) Notice: Subject to any disclaimer, the term of this patent is extended or adjusted under 35 U.S.C. 154(b) by 1391 days.

(21) Appl. No.: 16/486,125

(22) PCT Filed: Feb. 13, 2018

(86) PCT No.: PCT/EP2018/053558
§ 371 (c)(1),
(2) Date: Aug. 14, 2019

(87) PCT Pub. No.: WO2018/149825
PCT Pub. Date: Aug. 23, 2018

(65) Prior Publication Data
US 2020/0230065 A1    Jul. 23, 2020

(30) Foreign Application Priority Data

Feb. 14, 2017  (ES) .............................. ES201730174

(51) Int. Cl.
*A61K 9/48* (2006.01)
*A01N 25/26* (2006.01)
*A23L 33/10* (2016.01)

(52) U.S. Cl.
CPC ............ *A61K 9/4816* (2013.01); *A01N 25/26* (2013.01); *A23L 33/10* (2016.08); *A61K 9/4833* (2013.01)

(58) Field of Classification Search
None
See application file for complete search history.

(56) References Cited

U.S. PATENT DOCUMENTS

| 5,411,569 A | 5/1995 | Hjersted |
| 6,675,529 B1 | 1/2004 | Petrea et al. |

FOREIGN PATENT DOCUMENTS

| CN | 101885633 A | 11/2010 |
| CN | 102040425 A | 5/2011 |
| CN | 103058735 A | 4/2013 |
| CN | 105016914 A | 11/2015 |
| CN | 105272602 A | 1/2016 |
| CN | 107032914 A | 8/2017 |
| RU | 2255924 C1 * | 7/2005 |
| WO | 2015179687 A1 | 11/2015 |

OTHER PUBLICATIONS

Marchand, P. A. Basic Substances under EC1107/2009 phytochemical regulation: experience with non-biocide and food products as biorationals. Journal of Plant Protection Research, 56(3), 312-318. (Year: 2016).*
Wang, Z.; Gamble, D.S.; Langford, C.H. Interaction of atrazine with Laurentian humic acid. Analytica Chimica Acta, 244, 135-143. (Year: 1991).*
Siyawamwaya M. et al., "A Humic Acid-Polyquaternium-10 Stoichiometric Self-Assembled Fibrilla Polyelectrolyte Complex: Effect of pH on Synthesis, Characterization and Drug Release", 2016 International Journal of Polymeric Materials 65(11):550-560.
Zang et al., "Encapsulation of protein in humic acid from a Histosol as an explanation for the occurrence of organic nitrogen in soil and sediment", Organic Geochemistry, 2000, vol. 31, Issues 7-8, pp. 679-695.
Ferreira et al., "Hydrophobic Interactions between Spin-Label 5-SASL and Humic Acid As Revealed by ESR Spectroscopy", Environ. Qual. 2001, vol. 37, No. 3, pp. 310-319.
Martin-Neto et al., "On the interaction mechanisms of atrazine and hydroxyatrazine with humic substances", J. Environ. Qual., 2001, vol. 30, pp. 520-525.
Mirza et al., "Role of humic acid on oral drug delivery of an antiepileptic drug", Drug Development and Industrial Pharmacy, 2011, vol. 37, No. 3, pp. 310-319.
Anwer et al., "Inclusion Complex of Solid State Aspirin with Fulvic Acid: Dissolution, Permeability, Stability and Preliminary Pharmacological Studies", Journal of Biological Sciences, 2013, vol. 13, No. 5, pp. 302-312.

(Continued)

*Primary Examiner* — Jessica Worsham
(74) *Attorney, Agent, or Firm* — Verrill Dana, LLP

(57) ABSTRACT

The present invention relates to a method for the preparation of a humic substance-coated bioactive compound, to humic acid-encapsulated bioactive compound particles and to compositions comprising humic acid-encapsulated bioactive compound particles. The invention has its main application in the field of agriculture.

28 Claims, 5 Drawing Sheets

(56) References Cited

OTHER PUBLICATIONS

Mirza et al., "In vitro/in vivo performance of different complexes of itraconazole used in the treatment of vaginal candidiasis", Brazilian Journal of Pharmaceutical Sciences, 2012, vol. 48, No. 4, pp. 759-772.
Naota et al., "Molecules that assemble by sound: an application to the instant gelation of stable organic fluids", Journal of the American Chemical Society, 2005, vol. 127, No. 26, pp. 9324-9325.
Cravotto et al., "Molecular self-assembly and patterning induced by sound waves. The case of gelation", Chemical Society Reviews, 2009, vol. 38, No. 9, pp. 2684-2697.
Siyawamwaya, M. et al., "A humic acid-polyquaternium-10 stoichiometric self-assembled fibrilla polyelectrolyte complex: Effect of pH on synthesis, characterization, and drug release", International Journal of Polymeric Materials and Polymeric Biomaterials, 2016, vol. 65, No. 11, pp. 550-560, DOI: 10.1080/00914037.2016.1149843.

* cited by examiner

Figure 7 (Prior Art)

| Humic substances |||||
|---|---|---|---|---|
| Fulvic acids || Humic acids || Humin |
| Pale yellow | Yellowish brown | Dark brown | Gray-black | Black |
| ———— increase in color intensity ————▶ |||||
| ———— increase in degree of polymerization ————▶ |||||
| 2000 ———— increase in molecular weight ———— 300 000 ▶ |||||
| 45% ———— increase in carbon content ———— 62% ▶ |||||
| 48% ———— decrease in oxygen content ———— 30% ▶ |||||
| 1400 ———— decrease in exchange of acidity ———— 500 ▶ |||||
| ———— decrease in solubility ————▶ |||||

HUMIC SUBSTANCE-ENCAPSULATED PARTICLES, COMPOSITIONS AND METHOD OF MAKING THE SAME

FIELD OF THE INVENTION

The present invention relates to a method for the preparation of a humic substance-coated bioactive compound, to humic acid-encapsulated bioactive compound particles and to compositions comprising humic acid-encapsulated bioactive compound particles. The invention has its main application in the field of agriculture.

BACKGROUND OF THE INVENTION

Bioactive compounds, such as agrochemicals, neutraceuticals or drugs, are commonly used in many fields, including agriculture, food industry and medicine.

In agriculture, the use of agrochemical compositions (e.g. fertilizers) is broadly used to fulfil plants nutritional needs and to enhance crops yields. Agrochemical compositions improve the physical, chemical and biological properties of soils and therefore improve plants development.

One of the major problems arising from the use of agrochemical compositions is the fast degradation of the bioactive compounds in the soil. Agrochemical compositions tend to promptly lose their properties due to microbial activity and physico-chemical processes like soil fixation or oxidation. As a consequence, the amount of bioactive compounds available for the plant drops drastically over time, increasing the risk of nutritional deficiencies and/or increasing the risk developing diseases. To overcome these drawbacks, farmers can increase the application rates of agrochemical compositions or increase the amount of agrochemical compositions. However, the repeated application of agrochemical compositions and the increase of the amount of agrochemical compositions raise economic and environmental problems.

From an economic point of view, providing large amount of agrochemical compositions represents a significant cost. From an environmental point a view, providing large amount of agrochemical compositions may seriously damage the environment. The excessive use of agrochemical compositions results in bioactive compounds ending up in lakes, streams, rivers and oceans. An overuse of agrochemical compositions may also be poisonous for the plant itself.

The agrochemical industry has therefore developed agrochemical compositions comprising encapsulated (when the active ingredient is linked inside the macro or supra-molecule by weak attractive forces) or coated (when the molecular surface of the active ingredient is covered by a membrane thus affecting its dynamics of release to the media) bioactive compounds in order to limit the degradation of the bioactive compounds. For example, resin-based polymers and polyolefin material have been used as coating agents (M. E. Trenkel, *Slow-and Controlled-release and stabilized fertilisers*, 2010; R W Baker, *Controlled release of biologically active agents*, 1987). However, such encapsulating-agents or coating-agents are hardly biodegradable and may represent a risk for the environment. Furthermore, the dynamics of release of the known coated or encapsulated bioactive compounds is not governed by plant activity and needs. From an economic standpoint, the known coating-agents are usually expensive and thus represent a significant investment.

Furthermore, the preparation of a coated or encapsulated bioactive is technically challenging because the coating-agent or encapsulating-agent have to protect efficiently the bioactive compounds from alteration without being damaging to the soil.

Therefore, there is a need to provide an efficient, cheap and environmentally friendly agrochemical composition comprising a coated or encapsulated bioactive compound.

In this context, the inventors have surprisingly found that humic substances have the capability to encapsulate bioactive compounds. The inventors have therefore successfully developed a method for preparing a composition comprising a humic substance-encapsulated bioactive compound.

SUMMARY OF THE INVENTION

In a first aspect, the present invention relates to a method for preparing a composition comprising a humic substance-encapsulated bioactive compound, said method comprising the preparation of a solution comprising a humic substance and a bioactive compound, said solution having a pH lower than or equal to pH 4, preferably a pH lower than or equal to pH 3, pH 2, preferably from pH 1 to pH 2.

In a second aspect, the present invention relates to a method for preparing a composition comprising a humic substance-encapsulated bioactive compound, said method comprising the steps of:

a) Preparing a solution comprising a humic substance and a bioactive compound, said solution having a pH greater than or equal to pH 4, preferably greater than or equal to pH 5, pH 6, pH 7, pH 8, preferably from pH 8 to pH 10, and b) Lowering the pH of the solution to a pH lower than or equal to pH 4, preferably to a pH lower than or equal to pH 3, preferably from pH 1 to pH 2.

In a third aspect, the present invention relates to a method for preparing a composition comprising a humic substance-encapsulated bioactive compound, said method comprising the steps of:

a) Preparing a solution comprising a humic substance, said solution having a pH lower than or equal to pH 4, preferably a pH lower than or equal to pH 3, preferably from pH 1 to pH 2, and b) Adding a bioactive compound to the solution obtained in step a).

In a fourth aspect, the present invention relates to humic acid-encapsulated bioactive compound particles comprising:

(i) a core comprising a bioactive compound, and (ii) a humic substance encapsulating the core.

In a fifth aspect, the present invention relates to a composition comprising humic acid-encapsulated bioactive compound particles.

DETAILED DESCRIPTION OF THE INVENTION

The present invention results from humic substances' ability to form supramolecules that protect bioactive compounds from degradation. The applicant has shown that at pH lower than or equal to pH 4 humic substances begin to flocculate by the effect of acidity and humic properties in surface changes from hydrophilic to hydrophobic. The applicant has shown that this property allows the easy preparation of humic substance-encapsulated bioactive compounds. The encapsulation process is driven by both weak electronic attractive forces such as hydrogen bonds or van der walls forces, and thermodynamic favored processes (hydrophobic effect) (Stevenson, F. J., 1994. *Humus Chem-*

*istry*, Second Edition, Wiley, New York; Tan K H, Humic matter in soil and the environment. 2003).

The humic substances (HS) are biomolecules with both macromolecular and supramolecular character (Baigorri R, Fuentes M, Gonzalez-Gaitano G, García-Mina J M. (2007). *Simultaneous presence of diverse molecular patterns in humic substances in solution*, Journal of Physical Chemistry B. 111(35):10577-82) that constitute the principal elements of humus, which represents the natural organic matter in the soil (SOM), in water and in geological organic deposits such as lake sediments, peats, lignites and schists. They are largely responsible for the brown color of decomposed plant debris and also contribute to the brown-black color of the surface of soils. The HS are therefore very important components of the soil as they affect its physical and chemical properties and increase soil fertility. In aquatic systems, such as rivers, HS make up about 50% of the dissolved organic matter, and affect the pH and alkalinity.

The HS are complex, heterogeneous mixtures of polydispersed materials formed by chemical and biochemical reactions during the decomposition and transformation of plants and microbial residues, which result from a process known as humification. The lignin of plants and its products of transformation, as well as polysaccharides, melanin, cutin, proteins, lipids, nucleic acids, fine particles of carbonization residues, are important compounds taking part in this humification process.

These substances, which are of heterogeneous, complex composition, can be divided into three main fractions, humic acids (HA or HAs), fulvic acids (FA or FAs) and humin, and into subfractions (gray humic acid, brown humic acid, glucic acid, ulmic acid, apocrenic acid, hymatomelanic acid etc.) according to various criteria such as their acidity, their color, their solubility, etc.

The scheme shown in FIG. 7 is a representation of the physicochemical properties of humic substances according to Stevenson, F. J., 1994. *Humus Chemistry*, Second Edition, Wiley, New York.

The HS contain aromatic and polyaromatic groups (including heteroatoms) and C=C conjugated double bonds in aliphatic residues, acid groups, mainly phenol and carboxyl groups, carbonyls and sugars. They also contain stable free radicals. The molecular weight of the HS is between 2000 and 300 000 dalton.

The distribution of the principal elements of the HS, obtained by elemental analysis, is as follows: C (35-60%); O (30-50%); H (3-8%); N (0.3-4%); S (0.1-4%). The distribution of the functional groups and structural domains, analyzed by $^{13}C$ NMR and expressed as percentage of total carbon, is as follows: aliphatic unsaturated (5-50%); N-alkyl methoxy (0.5-15%); carbohydrates (10-50%); aromatic (5-50%); carboxylic (5-30%); ketonic (1-15%); phenol (3-10%).

Although the structure and the precise properties of a given sample of HS depend on the source of the soil and water and on the specific conditions of extraction, the average properties of HAs, FAs and humin of different origins are nevertheless remarkably similar.

The HS can be extracted from organic matter (peat, leonardite, soils, composts of animal and vegetable waste etc.) using an alkaline agent such as sodium hydroxide (NaOH) or potassium hydroxide (KOH). The alkaline organic extract thus obtained can then be separated by acidification into HAs (soluble in water at alkaline pH but insoluble at acid pH), FAs (soluble in water at any pH), and humin (residue that is insoluble in water at any. pH). In fact, in contrast to the FAs, the HAs are precipitated on adding a strong acid (for example adjusted to pH 1 with HCl). Humin cannot be extracted, neither with a strong base, nor with a strong acid. The HAs can also be further separated into gray HAs (insoluble at neutral pH and ionic strength above 1 M) and brown HAs (soluble at neutral pH and ionic strength above 1 M).

The aquatic HS only contain HAs and FAs and these compounds are generally removed from water by lowering the pH to 2 and adsorption of these compounds on a column of suitable resin, for example an adsorbent resin of polymeric nature marketed under the name Amberlite® XAD. The HAs and FAs are extracted from the resin with a strong base, then the pH is lowered to 1 to precipitate the HAs. Separation on a column of resin (for example an adsorbent resin of polymeric nature of the XAD type) is also used for separating the FAs from nonhumic material extracted from soils, such as amino acids, peptides, sugars, etc. At acid pH (3-4), the FAs are adsorbed on the resin whereas the nonhumic material passes through the column.

In addition to these HS of natural origin, it is also possible to use synthetic HS (humic acids, fulvic acids, oxidized humic substances such as oxy-humic and oxy-fulvic acids, etc.). Moreover, the humic substances can result from a synthesis process (Hanninen et al., 1987, *The Science of the Total Environment*, 62, 201-210) or from transformation of natural humic substances, notably by hemisynthesis. These various HS can be used individually or else as mixtures of several types of HS.

In the field of agriculture, the use of humic substance has many advantages:
- Humic substances are con-natural with natural environments and do not have any risk associated with toxicity or contamination,
- Humic substances play an important role in plant rhizosphere concerning either plant metabolism or plant mineral nutrition. The applicant has shown that all these effects on plants results from a direct interaction of humic substances with cells at root surface, being necessary a chemical crosstalk between humic supramolecules and roots. The applicant has now demonstrated that the release of the humic substance-encapsulated bioactive compound takes place when humic substance interacts with roots. It is another major advantage of the present invention in the field of agriculture, because the dynamics of release disclosed in the prior art is not governed by plant activity and needs,
- humic substances also have beneficial effects on plant growth besides their role as coating of bioactive compounds. Traditional processes employ encapsulating or coating material without any feature other than coating,
- Humic substances are much cheaper than the coating agents used in traditional encapsulating or coating processes.

In some embodiments, the humic substance is selected from the group consisting of humic acid and fulvic acid, preferably humic acid.

In some embodiments, the humic substance is a humic supramolecule. Supramolecules (also called supermolecules) are systems made of a discrete number of organized subunits interacting with each other through weak forces such as intermolecular forces, electrostatic forces or hydrogen bounding. A humic supramolecule is formed by the chemical association of two or more single organic natural organic molecules which can be held together through weak chemical bonds (i.e. non-covalent bonds) such as hydrogen bonds, van der waals forces bonds or hydrophobic interactions.

The humic supramolecule are well known by the skilled person and described in Piccolo A (2002) *The supramolecular structure of humic substances: a novel understanding of humus chemistry and implications in soil science.* Adv Agron 75: 57-134.

In the present invention, the terms "bioactive compound" refers to a compound that has an effect on living organism tissue or cell. Bioactive compounds can affect cells, tissues or the whole organism. Bioactive compounds are found in both plant and animal products or can be synthetically produced. Bioactive compounds can have an influence on plant, animal and/or human health and have a preventive or curative role. For example, a bioactive compound can be a fungicide or an anti-microbial. According to the invention, the bioactive compound is a hydrophilic bioactive compound or a hydrophobic bioactive compound, preferably a hydrophobic bioactive compound.

In a preferred embodiment according to the present invention, the bioactive compound is an agrochemical. An "agrochemical" is a chemical used in agriculture. It may refer to (i) pesticides including insecticides, herbicides, fungicides and nematicides, or (ii) fertilizers, hormones and other chemical growth agents.

In some embodiments, the bioactive compound is organic or synthetic. It may be selected from the group consisting of:
- a plant metabolite, such as aminoacids, plant hormones, phenols, essential oils, lipids, antioxidants, flavonols, flavonoids or phytoalexins;
- an essential oil such as an essential vegetable oil such as, tymol, eugenol, carvacrol, cinamaldehyde, garlic oil and/or neem oil;
- an extract from plants, such as extract from willow;
- a microorganisms, such as yeasts and/or bacteria, such as N-fixing bacteria (rhizobium, azospirillum), *bacillus* sp, *pseudomonas* sp and/or Mycorrhiza-inoculum (spores);
- an enzyme such as phytase and/or esterases;
- a drug such as a fungicide and/or an insecticide;
- a neutraceutical such as betaglucans; and/or
- an agrochemical, such as general pesticides.

Depending on the bioactive compound, the composition prepared by the method of the invention can be an agrochemical composition, a neutraceutical composition and/or a pharmaceutical composition. For example, an agrochemical composition according to the invention is preferably a biostimulant, a biopesticide, a biostumulant of plant growth, a plant mineral nutrition composition and/or plant health composition.

In a preferred embodiment, the active substance is not an ion, for example the active substance is not a metallic ion.

Method for Preparing a Composition Comprising a Humic Substance-Encapsulated Bioactive Compound The present invention relates to a method for preparing a composition comprising a humic substance-encapsulated bioactive compound, said method comprising the preparation of a solution comprising a humic substance and a bioactive compound, said solution having a pH lower than or equal to pH 4, preferably a pH lower than or equal to pH 3, pH 2, preferably from pH 1 to pH 2.

In one embodiment, the present invention relates to a method for preparing a composition comprising a humic substance-encapsulated bioactive compound, said method comprising the steps of:

a) Preparing a solution comprising a humic substance and a bioactive compound, said solution having a pH greater than or equal to pH 4, preferably greater than or equal to pH 5, pH 6, pH 7, pH 8, preferably from pH 8 to pH 10, and b) Lowering the pH of the solution to a pH lower than or equal to pH 4, preferably to a pH lower than or equal to pH 3, pH 2, preferably from pH 1 to pH 2.

The solution prepared in step a) is preferably a homogeneous solution. The preparation of the solution of step a) requires no particular effort for the skilled person. The solution can be prepared, for example and without limitation, as follow:

A desired amount of a humic substance (or a mixture of several humic substances) is dissolved in water with a basic water solution to obtain a humic substance water solution. A bioactive compound is then mixed in a liquid form to the humic substance water solution to obtain the solution of step a).

A desired amount of a humic substance (or a mixture of several humic substances) is dissolved in water with a basic water solution to obtain a humic substance water solution. A bioactive compound is then mixed in a solid form, preferably a powder of a bioactive compound, to the humic substance water solution to obtain the solution of step a). Preferably, more than 80% of the particles making the powder of bioactive compound have a diameter less than 3000 µm, for example less than 500 µm.

A desired amount of a powder of a humic substance (or a mixture of several humic substances) is mixed to a powder of a bioactive compound, to obtain a homogeneous powder. The homogeneous powder is then added to a suitable volume of water to obtain the solution of step a). Preferably, more than 80% of the particles making the powder of humic substance and the powder of bioactive compound have a diameter less than 3000 µm, for example less than 500 µm.

A desired amount of a powder of a humic substance (or a mixture of several humic substances) is mixed to a solution of a bioactive compound to obtain the solution of step a). Preferably, more than 80% of the particles making the powder of humic substance have a diameter less than 3000 µm, for example less than 500 µm.

If necessary, during the preparation of the solution of step a), the pH is increased to the target pH using an inorganic base (e.g. sodium hydroxide or potassium hydroxide) and/or an organic base (e.g. ethanolamine).

In some embodiments, the preparation of the solution of step a) is performed at room temperature and at atmospheric pressure.

In some embodiments, the ratio of humic substance to bioactive compound is from 1:0.01 to 1:0.2 by weight, preferably from 1:0.03 to 1:0.2, more preferably from 1:0.05 to 1:0.1.

In some embodiments, the pH is lowered in step b) by the addition of a mineral acid, preferably sulfuric acid. The pH is lowered under continuous stirring, eventually mixed, during a suitable time-period to obtain the composition comprising a humic substance-encapsulated bioactive compound.

Generally, the humic substance and the bioactive compound are mixed using any type of stirring adapter to mixing liquids with liquids, powder with liquids or powder with powder. The mixing time depends on the bioactive compound physicochemical properties and biological activity. For example, the mixing time may be from 10 minutes to 60 minutes.

In a specific embodiment, the method further comprises the step of:
c) treating the solution obtained in step b) with ultrasound to form a gel, and eventually
d) mixing the gel in water, preferably with one or more dispersing agents.

Step c) can be implemented after step b) or simultaneously to step d).

Ultrasonic treatment consists generally of the application of 0.5-50 W/cm3 Ultrasound power for a suitable time-period, for example from 5 minutes to 15 minutes.

In some embodiments, the dispersing agent is clay and/or organic surfactant, for example a polar activator such as glycerol or glycerol derivatives. The use of clay is particularly advantageous in the field of agriculture. Preferably, the concentration of dispersing agent is from 0.05% to 3% by weight referred to the final composition.

The time of each steps of the process is not particularly limited and may be adapted by the skilled person according to the needs. A suitable time for a specific step may be from one or more minutes to one or more hours. There is no difficulty for the skilled person to adapt the time for each step.

The temperature of the method is preferably room temperature (from 22° C. to 26° C.). As such, the method advantageously provides for relatively low (no) energy consumption. However, the skilled person may adapt the temperature to the need.

Alternatively, the invention also relates to a method for preparing a composition comprising a humic substance-encapsulated bioactive compound, said method comprising the steps of:
a) Preparing a solution comprising a humic compound, said solution having a pH lower than or equal to pH 4, preferably a pH lower than or equal to pH 3, pH 2, preferably from pH 1 to pH 2, and
b) Adding a bioactive compound to the solution obtained in step a).

In this alternative, the solution of step a) can be prepared by mixing a water solution (or a powder) containing the humic substance and an acidic solution. In some embodiments, the acidic solution is a mineral acid solution, preferably sulfuric acid solution. In some embodiments, the mixing is a continuous stirring.

In this alternative, the bioactive compound can be gradually added onto the solution obtained in step a) under continuous stirring during a suitable time-period to obtain the composition comprising a humic substance-encapsulated bioactive compound.

In this alternative, the method can further comprise the step of:
c) treating the solution obtained in step b) with ultrasound to form a gel, and eventually
d) mixing the gel in water, preferably with one or more dispersing agents.

Step c) can be implemented after step b) or simultaneously of step d).

Ultrasonic treatment consists generally of the application of 0.5-50 W/cm3 ultrasound power for a suitable time-period, for example from 5 minutes to 15 minutes.

In some embodiments, the dispersing agent is clay and/or organic surfactant, for example a polar activator such as glycerol or glycerol derivatives. The use of clay is particularly advantageous in the field of agriculture.

Humic Acid-Encapsulated Bioactive Compound Particles and Composition

The present invention also relates to humic substance-encapsulated bioactive compound particles comprising:
(i) a core comprising a bioactive compound, and
(ii) a humic substance encapsulating the core.

The present invention also relates to humic substance-encapsulated bioactive compound particles obtainable by the method of the invention comprising:
(i) a core comprising a bioactive compound, and
(ii) a humic substance encapsulating the core.

As used herein, the term "particles" is not particularly limited and is intended to include particles of any form. For example, but without limitation, the term is intended to include within its scope regular or irregular (i.e. non-spherical) particles, including lamellar particles.

As detailed above, the humic substance is selected from the group consisting of humic acid and fulvic acid, preferably humic acid.

As detailed above, the bioactive compound is a hydrophilic bioactive compound or a hydrophobic bioactive compound, preferably a hydrophobic bioactive compound. In some embodiments, the bioactive compound is selected from the group consisting of:
a plant metabolite, such as aminoacids, plant hormones, phenols, essential oils, lipids, antioxidants, flavonols, flavonoids or phytoalexins;
an essential oil such as an essential vegetable oil such as, tymol, eugenol, carvacrol, cinamaldehyde, garlic oil and/or neem oil;
an extract from plants, such as extract from willow;
a microorganisms, such as yeasts and/or bacteria, such as N-fixing bacteria (rhizobium, azospirillum), bacillus sp, *pseudomonas* sp and/or Mycorrhiza-inoculum (spores);
an enzyme such as phytase and/or esterases;
a drug such as a fungicide and/or an insecticide;
a neutraceutical such as betaglucans; and/or
an agrochemical, such as general pesticides.

As detailed above, the ratio of humic substance to bioactive compound is from 1:0.01 to 1:0.2 by weight, preferably from 1:0.03 to 1:0.2, more preferably from 1:0.05 to 1:0.1.

In a preferred embodiment, the humic acid-encapsulated bioactive particles have a particle size distribution from 100 to 100000 nm, for example from 500 to 5000 nm, for example from 1000 to 3000 nm. The particle size distribution may be determine using methods well known in the art, for example dynamic light scattering (DLS).

The present invention also relates to a composition comprising humic substance-encapsulated bioactive compound particles according to the invention and a suitable carrier.

In some embodiments, the composition is (i) an agrochemical composition, preferably biostimulant, biopesticide, biostumulant of plant growth, plant mineral nutrition or plant health, biopesticide, (ii) a neutraceutical composition or (iii) a pharmaceutical composition.

In some embodiments, an agrochemical composition comprises a suitable carrier such as a mineral or a natural or a synthetic (organic or inorganic) dispersant (surfactant). An agrochemical composition according to the invention may also comprise at least one plant nutrient. The at least one plant nutrient of embodiments herein may include nitrogen, phosphorous, potassium, calcium, sulfur, magnesium, boron, copper, iron, chloride, manganese, molybdenum, zinc, a precursor thereof or a combination thereof. In some embodiments, the plant nutrient may be boron, boric acid, disodium octaborate tetrahydrate, calcium borate, magnesium borate, sodium borosilicate, sodium tetraborate decahydrate, sodium borate, sodium tetraborate, disodium tetraborate or a combination thereof. In some embodiments, the plant nutrient may include lime, gypsum, superphosphate, iron sulfate, iron chelate, ferritin, zinc oxide, zinc sulfate, zinc chelate, potassium nitrate, calcium nitrate, magnesium nitrate, monoammonium phosphate, ammonium sulfate, magnesium sulfate, monopotassium phosphate, calcium carbonate, ammonium nitrate sulfate, ammonium thiosulfate, aqua ammonia, calcium cyanamide, crotonylidene diurea, diacyandiamide, isobutylidene diurea, sodium nitrate, potassium carbonate, potassium chloride, potassium magnesium sulfate, potassium metaphosphate, potassium sulfate, calcium chloride, calcium oxide, calcitic limestone, dolomitic limestone, magnesium ammonium phosphate, magnesium oxide, copper chelates, cupric ammonium phosphate, copper sulfate, copper frits, copper polyflavonoid, malachite, azurite, cuprous oxide, cupric oxide, cupric acetate, boric acid, sodium tetraborate, sodium tetraborate decahydrate, boron frit, sodium borosilicate, calcium borate, magnesium borate, sodium borate, disodium octaborate tetrahydrate, disodium tetraborate, ferric sulfate, ferrous sulfate, ferrous ammonium sulfate, ferrous ammonium phosphate, ferrous oxalate, ferrous carbonate, iron chelate, iron lignosulfonate, iron polyflavonoid, iron frits, iron methoxyphenylpropane, ferrous oxide, ferric oxide, iron ammonium polyphosphate, manganese oxide, manganese methoxyphenyl propane, manganese frits, manganese chloride, manganese carbonate, manganese sulfate, manganese chelate, manganese ammonium phosphate, manganese polyflavonoid, ammonium molybdate, sodium molybdate, molybdenum frit, molybdenum trioxide, molybdenum sulfide, zinc frit, zinc carbonate, zinc phosphate, zinc ammonium phosphate, zinc sulfide, zinc lignosulfonate, zinc polyflavonoid or a combination thereof.

In some embodiments, a neutraceutical composition comprises a suitable carrier such as a mineral or a natural or a synthetic (organic or inorganic) dispersant (or surfactant).

In some embodiments, a pharmaceutical composition comprises a suitable carrier such as a pharmaceutically acceptable carrier.

The composition of the invention may take any suitable form, for example dependent on the particular application of the composition. In certain embodiments, the encapsulated particles are in a solid form of a liquid form, for example in the form of a powder, granular, a gel, dispersion or a paste.

In some embodiment, the composition may be a suspension or dispersion in water, for example with a carrier such as a mineral or natural or synthetic dispersing agent. In another embodiment, the composition may be a powder, for example absorbed in a carrier such as clays, silicates or polymers.

Some embodiments of the invention also provide for a method of treating a plant nutrient deficiency. In some embodiments, the method includes administering the agrochemical composition of the invention. In some embodiments, the agrochemical composition is administered in an amount such that it is effective to treat the plant nutrient deficiency without causing toxicity. In some embodiments, the agrochemical composition may be administered as a spray, hydroponics, aeroponics, seed treatment, seedling root dipping, soil application, tissue culture, in vitro culture, application with irrigation water or a combination thereof.

DESCRIPTION OF THE FIGURES

FIG. 7: physicochemical properties of humic substances (Stevenson, F. J., 1994. Humus Chemistry, Second Edition, Wiley, New York).

EXAMPLES

Example 1

Preparation of a Composition of Humic Acid-Encapsulated Essential Oil of Origanum Vulgare A water solution containing 14% by weight of potassium humate (potassium salt of humic acid) was prepared by dissolving 50 kg of solid potassium humate in 300 liters of water under continuous stirring at room temperature (22-26° C.) and atmospheric pressure. The solution was stirred during 2 hours to obtain a stable solution of potassium humate at pH 8.5.

Figure 2:
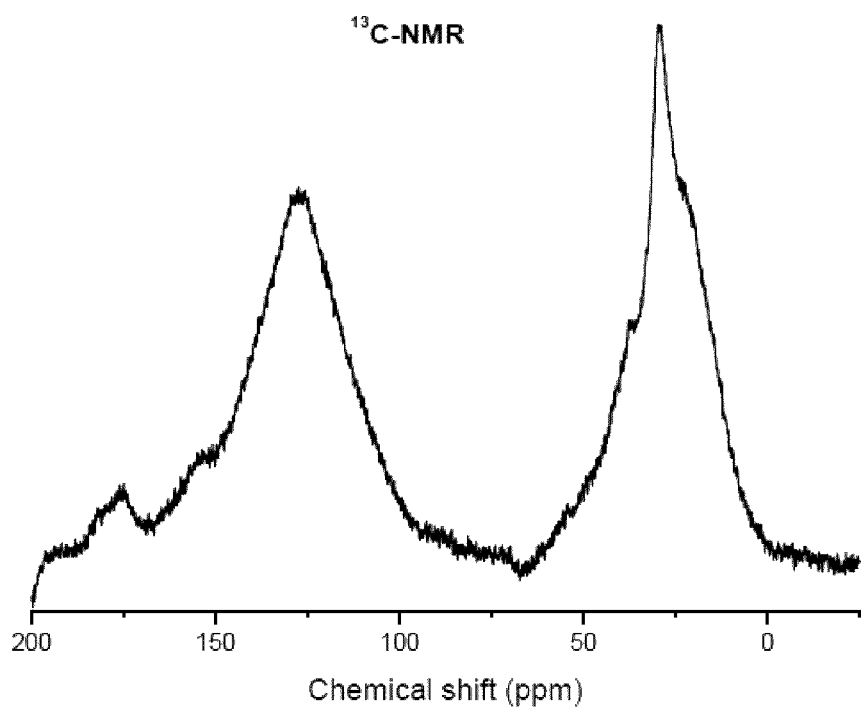
FIG. 2: Elemental Analysis and $^{13}$C-NMR of humic acid used in Example 1 and 2
Figure 3:
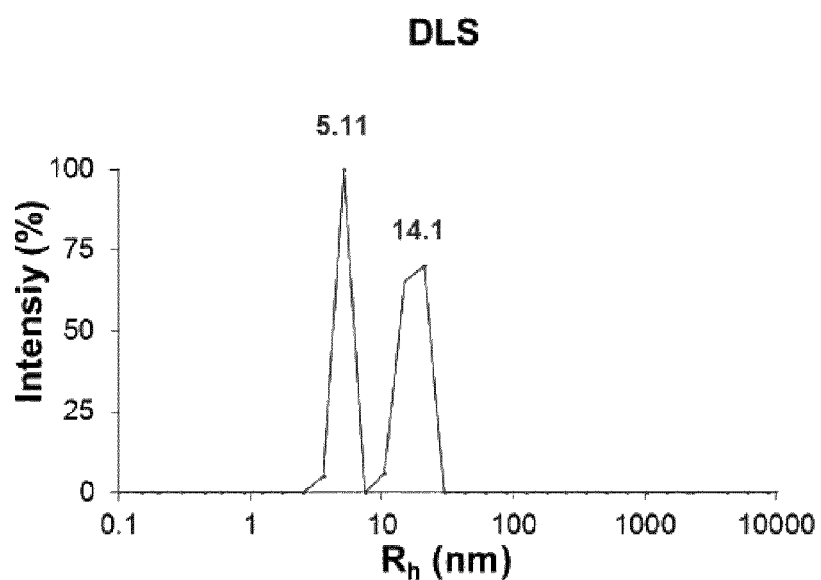
FIG. 3: Dynamic light scattering (DLS) analysis of size humic acid used in Example 1 and 2.
Figure 4:
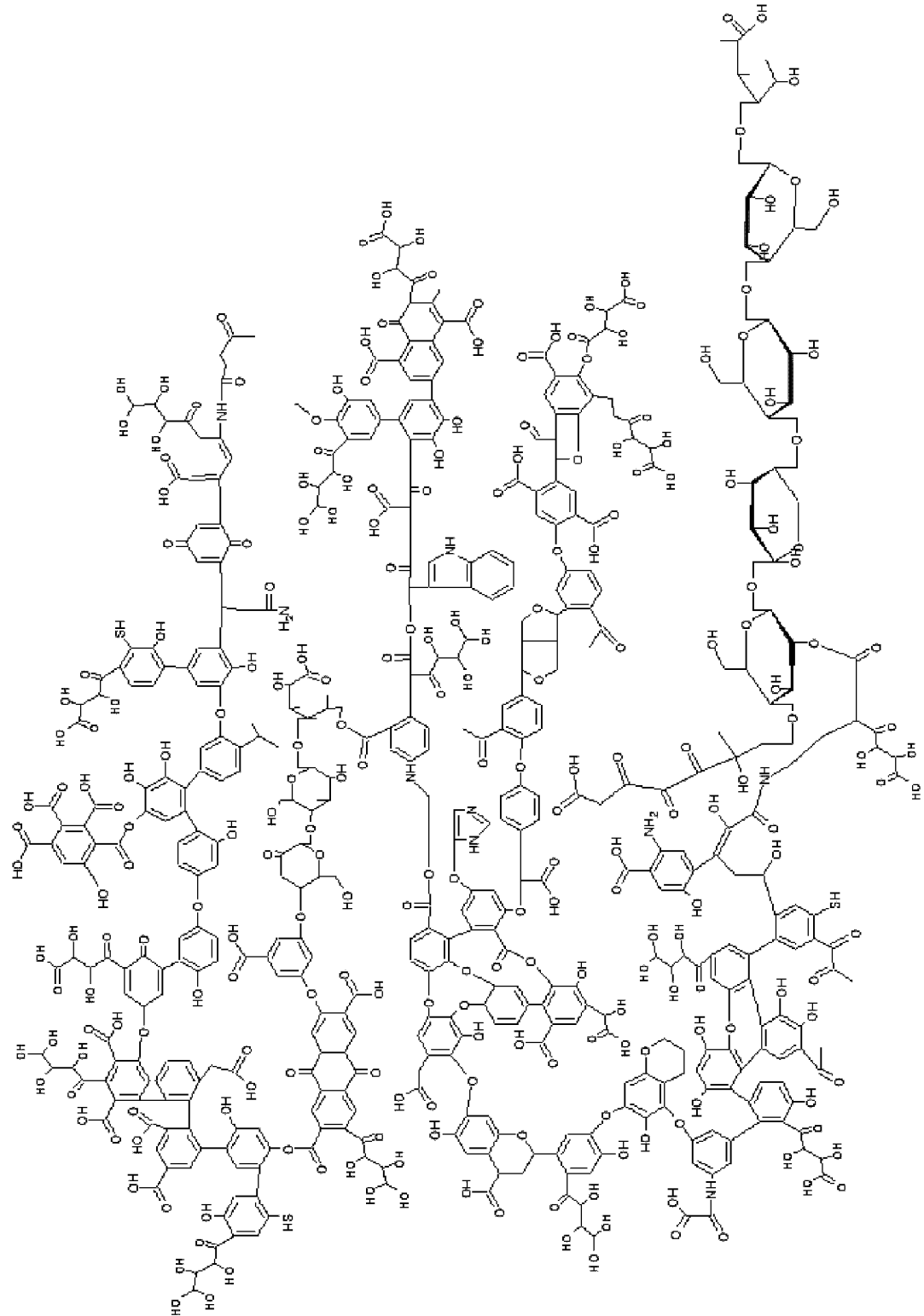
FIG. 4: Model Primary structure for humic acid used in Example 1 and 2.
Figure 5:
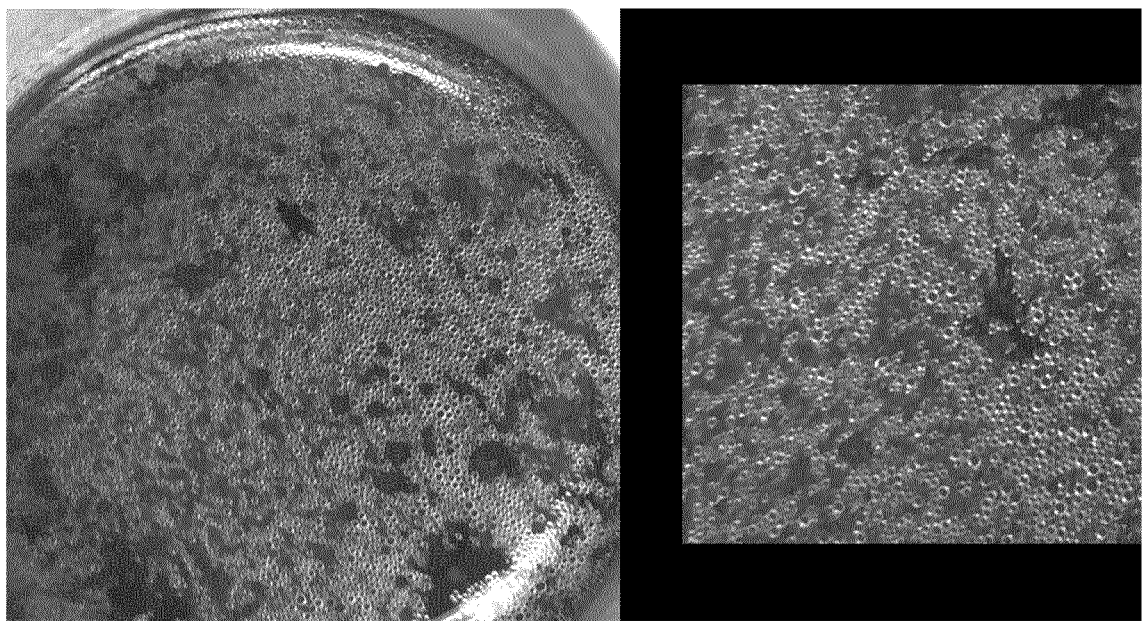
FIG. 5: picture showing the solution comprising the potassium humate and the essential oil (EO) (Solution A). This picture shows the phase separation between potassium humate and EO (small EO oil droplets floating on the surface of the potassium humate solution).

The solution of potassium humate was analysed for its element content (FIG. 2), as detailed in table 1 and table 2.

TABLE 1

Elemental analysis of humic acid contained in the solution of potassium humate used in examples 1 and 2.

| Element | % C | % H | % N | % S | % O* |
|---|---|---|---|---|---|
| Humic acid | 48.2 | 2.99 | 0.98 | 0.14 | 47.7 |

*O is calculated by difference

TABLE 2

$^{13}$C-NMR for humic acid contained in the solution of potassium humate used in examples 1 and 2.

| Region (% C) | Alkyl C | O-Alkyl C | Aromatic C | Phenolic C | Carboxylic C | Carbonylic C |
|---|---|---|---|---|---|---|
| ppm | 0-45 | 45-110 | 110-160 | 140-160 | 160-190 | 190-230 |
| Humic acid | 31.4 | 14.4 | 38.6 | 14.7 | 11.6 | 3.9 |

2.5 litters of essential oil of Origanum vulgare (EO) were progressivity added onto the solution of potassium humate under continuous stirring.

The solution comprising the potassium humate and the EO (Solution A) was then stirred during 30 minutes at room temperature (22-26° C.). The pH of solution A was pH 8.5.

The pH of solution A was then lowered to a pH between pH 1 and pH 2 by progressively adding diluted sulfuric acid (53° B) under continuous stirring and parallel in-continuous ultrasound treatment (2 W/cm$^3$ for 50 L/min) for 3 hours.

Figure 1:
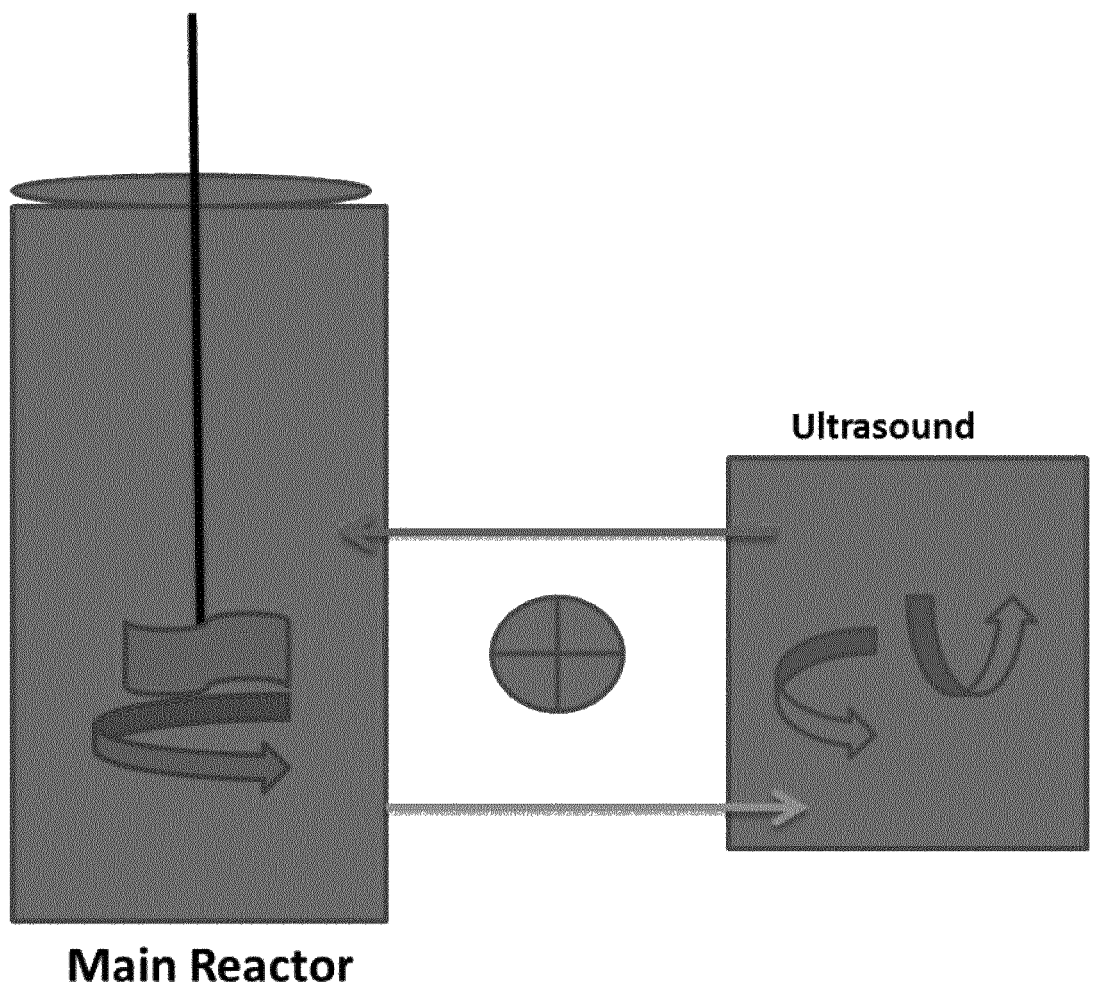
FIG. 1: diagram showing the operational flow

The pH of the solution was measured regularly to ensure that the pH was between pH 1 and pH 2. FIG. 1 is a diagram of the operation flow.

Figure 6:
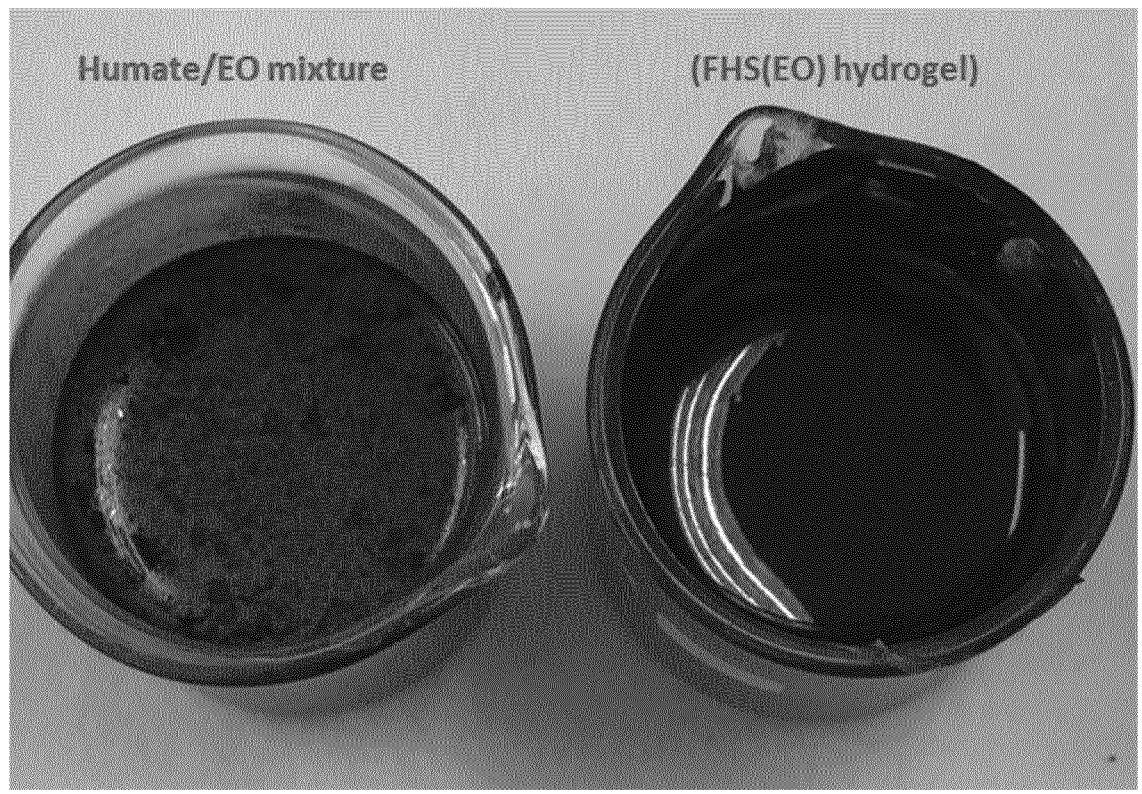
FIG. 6: picture showing the comparison between potassium humate and the EO mixture before coating, and the humic acid-encapsulated EO hydrogel after the coating.

The process led to the formation of a stable gel of humic acid-encapsulated EO, also called humic acid-encapsulated EO hydrogel (see FIG. 6).

The gel was then dispersed in water by adding 100 liters of water and 5 kg of micronized sepiolite (Pangel from TOLSA SA) under continuous stirring using a high shear rotor for 1 hour.

In order to assess the % of EO that was encapsulated in the humic molecule, the dispersion was then centrifuged and the supernatant, containing free EO, was treated with hexane (1:1) in order to extract free EO from the supernatant. After that, the EO in hexane was analysed by fluorescence spectroscopy. Results showed that the yield of EO encapsulated in the humic acid was 84.7%.

Example 2

Preparation of a Composition of Humic Acid-Encapsulated Willow Extract

A water solution containing 14% by weight of potassium humate was prepared by dissolving 50 kg of solid potassium humate in 300 liters of water under continuous stirring at room temperature (22-26° C.) and atmospheric pressure during 2 hours. The solution was stirred during 2 hours to obtain a stable solution of potassium humate at pH 8.5.

2.5 kg of willow extract (WE) were dispersed into 50 liters of water under conventional stirring at room temperature (22-26° C.) and at atmospheric pressure. The WE dispersion was progressivity added onto the solution of potassium humate under conventional stirring.

The solution comprising potassium humate and WE (solution A) was stirred during 30 minutes The pH of solution A was pH 8.5.

The pH of the solution A was lowered to a pH between pH 1 and pH 2 by adding diluted sulfuric acid (53° B) under continuous conventional stirring and parallel in-continuous ultrasound treatment (2 W/cm$^3$ for 50 L/min) for 15 min. The pH of the solution was measured regularly to ensure that the pH was between pH 1 and pH 2. FIG. 1 is a diagram of the operation flow.

The process led to the formation of a gel comprising humic acid-encapsulated WE, also called humic acid-encapsulated WO hydrogel.

The gel was then dispersed in water by adding 50 liters of water and 5 kg of micronized sepiolite under continuous stirring using a high sear rotor for 1 hour.

The dispersion was then centrifuged and the supernatant, containing free WE, was removed. The yield of the humic acid-encapsulated WE (salicin and salicylates) was measured with HPLC-fluorescence and found to be 100%.

REFERENCES

Piccolo A (2002) The supramolecular structure of humic substances: a novel understanding of humus chemistry and implications in soil science. Adv Agron 75: 57-134

Stevenson F J (1994) Humus chemistry: Genesis, Composition, Reactions, Ed Second. Wiley, United States of America Trenkel M E (2010). Slow- and controlled-release and stabilized fertilizers. International Fertilizer Industry Association (IFA), Paris.

Hanninen et al., 1987, *The Science of the Total Environment*, 62, 201-210

R W Baker, *Controlled release of biologically active agents*, 1987

Tan K H, Humic matter in soil and the environment. 2003

Baigorri R, Fuentes M, Gonzalez-Gaitano G, Garcia-Mina J M. (2007) Simultaneous presence of diverse molecular patterns in humic substances in solution. Journal of Physical Chemistry B. 111(35):10577-82

The invention claimed is:

1. A method for preparing a composition comprising a humic substance-encapsulated bioactive compound, said method comprising the steps of:
    (a) preparing a solution comprising a humic substance and a bioactive compound, said solution having a pH greater than or equal to pH 4, and
    (b) lowering the pH of the solution to a pH lower than 4,
    (c) treating the solution obtained in step b) with ultrasound to form a gel, and
    (d) mixing the gel in water.

2. The method according to claim 1, further comprising the step of:
    a1) adding a bioactive compound to the solution obtained in step a).

3. The method according to claim 1, wherein the composition is an agrochemical composition, a neutraceutical composition or a pharmaceutical composition.

4. The method according to claim 1, wherein the humic substance is a humic supramolecule.

5. The method according to claim 1, wherein the humic substance is selected from the group consisting of humic acid and fulvic acid.

6. The method according to claim 1, wherein the bioactive compound is a hydrophobic bioactive compound.

7. The method according to claim 1, wherein the ratio of humic substance to bioactive compound is from 1:0.01 to 1:0.2 by weight.

8. The method according to claim 1, wherein the pH is lowered by adding a mineral acid.

9. The method according to claim 1, wherein the solution in step a) has a pH greater than or equal to pH 5.

10. The method according to claim 1, wherein the solution in step a) has a pH greater than or equal to pH 6.

11. The method according to claim 1, wherein the solution in step a) has a pH greater than or equal to pH 7.

12. The method according to claim 1, wherein the solution in step a) has a pH greater than or equal to pH 8.

13. The method according to claim 1, wherein the solution in step a) has a pH from 8 to 10.

14. The method according to claim 1, wherein the solution in step b) has a pH less than or equal to pH 3.

15. The method according to claim 1, wherein the solution in step b) has a pH less than or equal to pH 2.

16. The method according to claim 1, wherein the solution in step b) has a pH from 1 to 2.

17. The method according to claim 6, wherein the hydrophobic bioactive compound is selected from the group consisting of plant metabolites, essential oils, plant extracts, microorganisms, enzymes, drugs, neutraceuticals, and agrochemicals.

18. The method according to claim 17, wherein the hydrophobic bioactive compound is a plant metabolite selected from the group consisting of amino acids, plant hormones, phenols, essential oils, lipids, antioxidants, flavonols, flavonoids, and phytoalexins.

19. The method according to claim 17, wherein the hydrophobic bioactive compound is an essential oil selected from the group consisting of tymol, eugenol, carvacrol, cinamaldehyde, garlic oil, and neem oil.

20. The method according to claim 17, wherein the hydrophobic bioactive compound is a plant extract, and the plant extract is extract from willow.

21. The method according to claim 17, wherein the hydrophobic bioactive compound is a microorganism selected from the group consisting of yeasts, bacteria, N-fixing bacteria, *bacillus* sp, *pseudomonas* sp. and Mycorrhiza-inoculum.

22. The method according to claim 17, wherein the hydrophobic bioactive compound is an enzyme selected from the group consisting of phytases and esterases.

23. The method according to claim 17, wherein the hydrophobic bioactive compound is a drug selected from the group consisting of fungicides and insecticides.

24. The method according to claim 17, wherein the hydrophobic bioactive compound is a neutraceutical, and the neutraceutical is a betaglucan.

25. The method according to claim 17, wherein the hydrophobic bioactive compound is an agrochemical, and the agrochemical is a general pesticide.

26. The method according to claim 7, wherein the ratio of humic substance to bioactive compound is from 1:0.05 to 1:0.1 by weight.

27. The method according to claim 8, wherein the mineral acid is sulfuric acid.

28. The method according to claim 1, wherein in step (d) the gel is mixed in water with one or more dispersing agents.

\* \* \* \* \*